United States Patent [19]

Schilling

[11] Patent Number: 5,776,234
[45] Date of Patent: Jul. 7, 1998

[54] ANIONIC BITUMINOUS EMULSIONS WITH IMPROVED ADHESION

[75] Inventor: Peter Schilling, Charleston, S.C.

[73] Assignee: Westvaco Corporation, New York, N.Y.

[21] Appl. No.: 695,641

[22] Filed: Aug. 12, 1996

[51] Int. Cl.$^6$ ............................................. C08L 95/00
[52] U.S. Cl. ................. 106/277; 106/278; 106/284.06; 252/311.5; 252/356
[58] Field of Search ................. 252/311.5, 356; 106/277, 278, 284.06

[56] References Cited

U.S. PATENT DOCUMENTS

| | | | |
|---|---|---|---|
| 2,426,220 | 8/1947 | Johnson | 106/223 |
| 2,679,462 | 5/1954 | Monson | 106/223 |
| 2,891,872 | 6/1959 | Voet | 106/28 A |
| 3,006,860 | 10/1961 | Heinz | 252/311.5 |
| 3,062,829 | 11/1962 | Wright et al. | 252/311.5 |
| 3,108,971 | 10/1963 | Mertens | 252/311.5 |
| 3,123,569 | 3/1964 | Borgfeldt | 252/311.5 |
| 3,230,104 | 1/1966 | Falkenberg et al. | 106/277 |
| 3,240,716 | 3/1966 | Mertens | 252/311.5 |
| 3,245,451 | 4/1966 | Gellman | 152/225 C |
| 3,246,008 | 4/1966 | Evans et al. | 548/314.4 |
| 3,344,082 | 9/1967 | Montgomery et al. | 252/311.5 |
| 3,347,690 | 10/1967 | Galvin et al. | 106/269 |
| 3,350,321 | 10/1967 | Conn | 252/311.5 |
| 3,451,958 | 6/1969 | Riedemann et al. | 524/114 |
| 3,507,787 | 4/1970 | Pratt et al. | 210/734 |
| 3,594,201 | 7/1971 | Sommer et al. | 106/277 |
| 3,615,796 | 10/1971 | Schreuders | 106/277 |
| 3,615,797 | 10/1971 | Ohtsuka et al. | 252/311.5 |
| 3,740,344 | 6/1973 | Ferm | 252/311.5 |
| 3,766,133 | 10/1973 | Strand et al. | 524/546 |
| 3,861,933 | 1/1975 | Doi | 106/284.4 |
| 3,868,263 | 2/1975 | McConnaughay | 106/277 |
| 3,928,061 | 12/1975 | Hellsten et al. | 106/277 |
| 3,941,808 | 3/1976 | Pratt | 525/379 |
| 3,947,395 | 3/1976 | Ogata et al. | 527/501 |
| 3,956,002 | 5/1976 | Moorer | 106/277 |
| 3,963,509 | 6/1976 | Doi et al. | 106/284.02 |
| 4,088,505 | 5/1978 | Moorer | 106/277 |
| 4,248,749 | 2/1981 | Hayashi et al. | 106/269 |
| 4,293,459 | 10/1981 | Detroit | 106/277 |
| 4,547,224 | 10/1985 | Schilling | 106/277 |
| 4,561,901 | 12/1985 | Schilling | 106/277 |
| 4,639,273 | 1/1987 | Gilmore et al. | 106/282 |
| 4,676,927 | 6/1987 | Schilling et al. | 252/311.5 |
| 4,677,146 | 6/1987 | Senz | 524/69 |
| 4,714,727 | 12/1987 | Hume, III | 524/271 |
| 4,789,402 | 12/1988 | Kostusyk | 106/273.1 |
| 4,806,166 | 2/1989 | Schilling et al. | 106/284.06 |
| 5,194,640 | 3/1993 | Cosgrove et al. | 554/126 |
| 5,208,319 | 5/1993 | Schilling | 530/210 |
| 5,391,636 | 2/1995 | Schilling | 370/291 |
| 5,667,578 | 9/1997 | Schilling | 106/277 |
| 5,670,562 | 9/1997 | Schilling | 106/277 |

FOREIGN PATENT DOCUMENTS 82305420  10/1982  European Pat. Off.

Primary Examiner—Richard D. Lovering
Assistant Examiner—Daniel S. Metzmaier
Attorney, Agent, or Firm—Daniel B. Reece IV; Terry B. McDaniel; Richard L. Schmalz

[57] ABSTRACT

This invention relates to rapid set, medium set, and slow set anionic emulsions prepared from straight bitumen or bitumen modified by the incorporation of polymers such as styrene butadiene rubbers (SBR), styrene block copolymers (SBS), ethylene vinyl acetate copolymers (EVA), and other suitable modifiers. The invention also relates to emulsions modified by the incorporation of solvents (such as diesel oil or kerosene) or by the addition of polymer latices (such as SBR-latex or natural rubber latex). More particularly, the invention relates to improved methods for enhancing adhesion between asphalt and aggregate in anionic solventless and solvent-containing bituminous emulsions wherein the emulsifiers are alkali earth salts of tall oil fatty acids, fortified tall oil fatty acids, tall oil rosin, and fortified rosin as well as combinations of kraft lignin and nonionic emulsifiers. The adhesion promoters utilized in these improved methods are the reaction products of styrene-maleic anhydride polymers with polyalkylene amines. Further improvement can be obtained by using tall oil fatty acid or fortified tall oil fatty acids as co-reactants in producing the polyimidoamine products.

12 Claims, No Drawings

ANIONIC BITUMINOUS EMULSIONS WITH IMPROVED ADHESION

FIELD OF INVENTION

This invention relates to rapid set, medium set, and slow set anionic emulsions prepared from straight bitumen or bitumen modified by the incorporation of polymers such as styrene butadiene rubbers (SBR), styrene block copolymers (SBS), ethylene vinyl acetate copolymers (EVA), and other suitable modifiers. The invention also relates to emulsions modified by the incorporation of solvents (such as diesel oil or kerosene) or by the addition of polymer latices (such as SBR-latex or natural rubber latex). More particularly, the invention relates to improved methods for enhancing adhesion between asphalt and aggregate in anionic solventless and solvent-containing bituminous emulsions wherein the emulsifiers are alkali earth salts of tall oil fatty acids, fortified tall oil fatty acids, tall oil rosin, and fortified rosin as well as combinations of kraft lignin and nonionic emulsifiers. The adhesion promoters utilized in these improved methods are the reaction products of styrene-maleic anhydride polymers with polyalkylene amines. Further improvement can be obtained by using tall oil fatty acid or fortified tall oil fatty acids as co-reactants in producing the polyimidoamine products.

BACKGROUND OF THE INVENTION

In paving operations, three main practices are employed to achieve thorough mixing of bitumen and aggregate:

(1) mixing of free flowing heated asphalt (asphalt cement) with pre-dried aggregate, (2) mixing pre-dried aggregate with asphalt diluted with a hydrocarbon solvent (cutback asphalt, cutter stock) at ambient or slightly elevated temperatures, and (3) mixing aggregate with asphalt emulsions, e.g., oil in water emulsions, obtained by vigorous agitation of asphalt and water in the presence of an emulsifying agent.

The escalating costs of energy and hydrocarbon solvents coupled with a heightened environmental awareness have stimulated increases in the use of emulsified asphalt in the road paving industry. The type of emulsifier employed is determined by the desired application of the asphalt emulsion. For anionic rapid set emulsions (mainly used for chip sealing) and high float emulsions sodium soaps of tall oil are commonly utilized. For medium set emulsions (applied in cold mixes of virgin aggregate or reclaimed asphalt pavement) higher concentrations of tall oil or modified tall oil soaps are generally being used with and without the addition of moderate amounts of hydrocarbon solvent. Slow set emulsions with good mix stability in the presence of fine graded aggregate are based on vinsol (a by-product of the wood rosin manufacture), on fortified tall oil rosin in combination with kraft lignin or lignosulfonates, and combinations of kraft lignin or lignosulfonates with nonionic emulsifiers from the class of ethoxylated alkylphenols, ethoxylated linear or branched fatty alcohols, and of ethylene oxide-propylene oxide-block co-polymers. In anionic emulsions the asphalt droplets are stabilized by anionic surfactants (wherein their negatively-charged surface migrates to the anode when an electric field is applied).

In the case of rapid set emulsions (mainly used for repair work of old wearing courses) the emulsion is applied on the existing surface and aggregate is spread on top. After the water of the emulsion has evaporated, an intimate matrix of asphalt and stone with good load bearing capacity is formed.

The road can be re-opened to traffic shortly after application of the seal. Medium set emulsions are commonly being mixed with aggregate in a pug mill prior to being used in road construction. The incorporation of solvent allows the mixes to be stock piled prior to use. The mixes are prepared in central mixing plants and transported to the job sites or are generated "in-place". Slow set emulsions are being applied where good penetration and wetting is necessary. Mixes with high loadings of fines, base stabilization and tack coat are the main applications.

Anionic emulsions are taught by Mertens in U.S. Pat. No. 3,062,829 to be prepared via the use of alkali hydroxide which saponify the surface active acids naturally occurring in asphalt. These emulsions contain high molecular weight polyamides (Versene) as viscosity reducers and adhesion promoters. In U.S. Pat. No. 3,108,971 to Mertens anionic emulsions of the same type are improved with the addition of alkanol amines lacking lipophilic characteristics. Lignin amines are taught by Borgfeldt in U.S. Pat. No. 3,123,569. Quick setting emulsions obtained from highly acidic asphalts using lithium hydroxide are disclosed by Mertens in U.S. Pat. No. 3,240,716. Montgomery and Pitchford teach the alkali metal salts of complex polynuclear aromatic polycarboxylic acids as anionic emulsifiers in U.S. Pat. No. 3,344,082. Heinz in U.S. Pat. No. 3,006,860 employs alkali metal soaps of higher fatty acids such as those found in tall oil. In U.S. Pat. Nos. 3,956,002 and 4,088,505 Moorer teaches anionic emulsifiers consisting of alkali lignin or oxygenated alkali lignin, an ethylene oxide adduct of alkylphenol, and up to 10% by weight of sodium borate. Detroit describes in U.S. Pat. No. 4,293,459 combinations of partially desulfonated oxygenated lignosulfonates and nonionic surfactants. Schilling et al. disclose the alkali soaps of maleated or fumarated tall oil fatty acids or rosin, of DIACID® 1550, and of sulfonated tall oil fatty acid as emulsifiers for anionic high float emulsions in U.S. Pat. No. 4,676,927 and the use of carboxyethylated modified tall oil amidoamines as emulsifiers for anionic slurry seal in U.S. Pat. No. 4,561,901. Ferm in U.S. Pat. No. 3,740,344 teaches the preparation of quick set anionic slurry seal compositions by applying a combination of aryl alkyl sulfonates and ethylene oxide adducts of alkyl phenols and of fatty alcohols. Schreuders in U.S. Pat. No. 3,615,796 teaches the use of petroleum sulfonates. A combination of sodium lignate or lignosulfonate and saponified tall oil or rosin is disclosed in U.S. Pat. No. 3,594,201 by Sommer and Evans. In U.S. Pat. No. 3,350,321 Conn describes the use of alkyl or alkoxy alkyl phosphoric acid salts as emulsifiers for asphalt.

Anionic emulsions are generally prepared at emulsifier concentrations of 0.2–10.0% based on 100% activity, preferentially at 0.2 to 2.0%. The pH range is 7 to 14, preferentially at 10 to 12 in the case of tall oil and rosin soaps. The advantage of anionic emulsions lies in the relatively low cost of tall oil based emulsifiers. The disadvantage is the low bond strength of asphalt to aggregate once the emulsions has dried and formed a film of asphalt on the surface of the aggregate. As most of the aggregates are negatively charged, the electrostatic repulsion between the negatively charged asphalt and the negatively charged stones causes inferior adhesion. Highly acidic aggregates such as quartzite, granite, rhyolite and many of the sedimentary, metamorphic and igneous rocks are considered responsible for the existing bitumen-stripping problem. This problem is also encountered in hot mix applications and when cut back asphalts are being used.

The quality of the road surface is generally dependent upon the strength of the bonds between the asphalt and the aggregate after curing of the composition. Poor service performance is due to poor adhesion, which results in asphalt stripping off the aggregate surface. Asphalt compositions have relatively poor adhesion to aggregate in the presence of water. Since the aggregate is preferentially wetted by water, the eventual penetration of water into the composition reaches the aggregate and interferes with the bond between aggregate and asphalt. The result of this stripping is flaked pavement and the formation of pot holes.

To reduce water-induced debonding of asphalt from the stone surface, in many cases surface-active amines or diamines are added to the asphalt. Generally, anti-stripping agents or adhesion promoters are introduced into the asphalt prior to the asphalt being mixed with the aggregate. In the case of anionic asphalt emulsions it is advantageous to add the additive to the emulsion to prevent degradation at the high pH values. The patent literature sets forth a large number of compounds which can be used to improve adhesion of asphalt to aggregate. These include ethylene oxide condensates of long chain alkyl triamines (U.S. Pat. No. 3,615,797), alkoxylated amines and their salts (U.S. Pat. No. 3,347,690) and reaction products of ozonized unsaturated fatty acids with polyalkylene amines (U.S. Pat. Nos. 3,246,008 and 3,245,451). Other additives are based on fatty carboxylic chromites (U.S. Pat. No. 3,963,509), on combinations of epoxy resins and onium borates (U.S. Pat. No. 3,947,395), on tall oil alkanol amines and amido amines (U.S. Pat. Nos. 2,679,462 and 4,806,166), on fatty ether amines in combination with alkanol amines (U.S. Pat. No. 3,928,061), on fatty acid amido amine soaps (U.S. Pat. Nos. 2,426,220, 2,891,872 and 3,230,104). Aminoalkyl polyalkoxysilanes are disclosed in U.S. Pat No. 3,861,933; and condensation products of amines, polyamines, and amides with formaldehyde are taught in U.S. Pat. No. 4,639,273. Mannich reaction products of polyamines with formaldehyde and alkylphenols are described in U.S. Pat. No. 4,789,402, and ethoxylated hexamethylene-diamines and their derivatives are taught in Europ. Patent Appl. 0 077 632 (82305420.0). Fatty primary, secondary and tertiary amines and imidazolines, their reaction products with various acids (including fatty acids), metal soaps, and several other compounds including rosin reaction products are described in U.S. Pat. No. 3,868,263.

One relatively inexpensive class of adhesion promoters which have shown promise for use in hot mix and in cut back asphalts are tall oil-based polyethylene amine condensation products. However, a major problem exists with such adhesion promoters in that their adhesion efficiencies are not high enough to obtain satisfactory results when they are utilized in anionic emulsions. It is, therefore, the object of this invention to solve this problem by disclosing an improved method for enhancing adhesion between asphalt and aggregate in anionic bituminous emulsions.

SUMMARY OF THE INVENTION

The objective of this invention is met by adding a polyimidoamine adhesion promoter to the anionic bituminous emulsion. Suitable polyimidoamine adhesion promoters are produced by reacting a styrene-maleic anhydride copolymer (alone or blended with tall oil fatty acid or rosin) in a condensation reaction with a polyamine (or blends of polyamines). A preferred method utilizes adhesion promoters produced by substituting up to 90% of the styrene-maleic anhydride copolymer with a member selected from the group consisting of $C_8-C_{20}$ fatty acids, $C_9-C_{22}$ modified fatty acids, of rosin, and $C_{23}-C_{24}$ modified rosins, or combinations thereof.

These improved methods for enhancing adhesion between asphalt and aggregate is effective even when utilized with traditionally recalcitrant, highly acidic aggregates. The adhesion promoting effects produced via the addition of these products are primarily due to the products' ability to migrate to the asphalt/aggregate interphase, where they hydrophobize the aggregate surface and render it water repellent. In addition, these products also increase adhesion by neutralizing some of the negative charges introduced into the asphalt by the anionic character of the emulsifier.

DESCRIPTION OF THE PREFERRED EMBODIMENT

The improved method for enhancing adhesion between asphalt and aggregate in anionic bituminous (asphalt) emulsions comprises the addition to the emulsion of a composition comprising the polyimidoamine condensation reaction products of:

(A) 20–80 wt. % of a copolymer, formed by reacting
  (1) 1–99 wt. % of a member selected from the group consisting of α-methyl styrene, styrene, and combinations thereof, with
  (2) 99–1 wt. % of maleic anhydride; and (B) 80–20 wt. % of a polyamine.

The process of producing these adhesion promoters (which are also effective as corrosion inhibitors for steel exposed to highly acidic environments) was disclosed by Schilling in U.S. Pat. No. 5,391,636 (which is hereby incorporated by reference). First, in a polymerization reaction (α-methyl) styrene reacts with maleic anhydride form a styrene-maleic anhydride copolymer. This copolymer is subsequently reacted in a condensation reaction with a polyamine or a blend of polyamines to form a polyimidoamine adhesion promoter. These reaction are presented in FIG. 1. below:

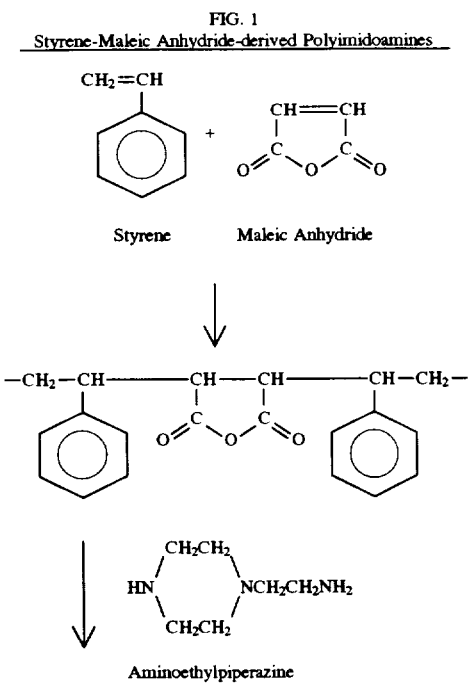

FIG. 1
Styrene-Maleic Anhydride-derived Polyimidoamines

FIG. 1

Styrene-Maleic Anhydride-derived Polyimidoamines

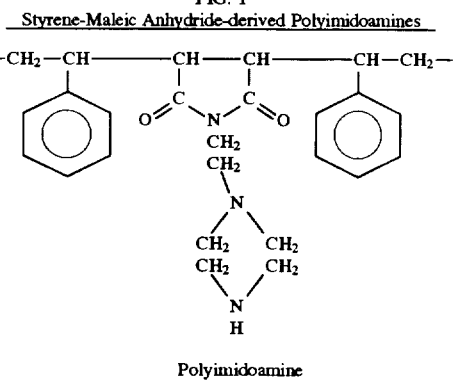

Polyimidoamine

A preferred method for improving adhesion between asphalt and aggregate in anionic bituminous (asphalt) emulsions comprises the addition to the emulsion of a composition comprising the polyimidoamine condensation reaction products of:

(A) 30–70 wt. % of a copolymer, formed by reacting
  (1) 20–80 wt. % of a member selected from the group consisting of α-methyl styrene, styrene, and combinations thereof, with
  (2) 80–20 wt. % of maleic anhydride; and
(B) 70–30 wt. % of a polyamine.

The ratio of (α-methyl) styrene to maleic anhydride required to yield the desired styrene-maleic anhydride copolymers ranges from about 1:1 to 3:1. These copolymers are produced by heating in the presence of a suitable radical initiator and a suitable solvent the desired mixture of (α-methyl) styrene and maleic anhydride to a temperature in the range of about 85°–270° C. for a time sufficient for the polymerization to occur (commonly 1 to 20 minutes). This reaction is described in U.S. Pat. No. 3,766,133 to Strand et al., which is hereby incorporated by reference. Styrene-maleic anhydride copolymers suitable for use in the invention have number average molecular weights in the range of about 400 to about 5000. The half-esters of these copolymers can also be utilized.

The ratio of (α-methyl) styrene-maleic anhydride copolymer to polyamine required to produce the desired polyimidoamine adhesion promoters ranges from about 1:1 to 2.5:1. These promoters are obtained by heating the desired mixture of (α-methyl) styrene-maleic anhydride copolymer and polyamine to a range of 180°–240° C. for a time sufficient for the condensation reaction to occur (commonly 16 to 24 hours). The presence of a solvent with high boiling point such as diethylene glycol or dipropylene glycol is beneficial to the reaction.

A more preferred method for enhancing the adhesion of asphalt to aggregate in anionic bituminous emulsions comprises the addition to the emulsion of a composition comprising the polyimidoamine condensation reaction products of:

(A) 20–80 wt. % of a mixture containing:
  (1) 20–80 wt. % of a copolymer formed by reacting
    (a) 1–99 wt. % of a member selected from the group consisting of α-methyl styrene, styrene, and combinations thereof, with
    (b) 99–1 wt. % of maleic anhydride; and
  (2) 80–20 wt. % of a member selected from the group consisting of rosin, $C_{23}$–$C_{24}$ modified rosins, $C_8$–$C_{20}$ fatty acids, $C_9$–$C_{22}$ modified fatty acids, and combinations thereof, and
(B) 80–20 wt. % of a polyamine.

The most preferred method for enhancing the adhesion of asphalt to aggregate in anionic bituminous emulsions comprises the addition to the emulsion of a composition comprising the polyimidoamine condensation reaction products of:

(A) 30–70 wt. % of a mixture containing:
  (1) 20–80 wt. % of a copolymer formed by reacting
    (a) 20–80 wt. % of a member selected from the group consisting of α-methyl styrene, styrene, and combinations thereof, with
    (b) 80–20 wt. % of maleic anhydride; and
  (2) 80–20 wt. % of a member selected from the group consisting of rosin, $C_{23}$–$C_{24}$ modified rosins, $C_8$–$C_{20}$ fatty acids, $C_9$–$C_{22}$ modified fatty acids, and combinations thereof, and
(B) 70–30 wt. % of a polyamine.

Adhesion promoters suitable for use in these preferred methods are produced by replacing up to 80% of the styrene-maleic anhydride acid copolymer with a member selected from the group of rosin (i.e. resin acid), $C_{23}$–$C_{24}$ modified rosins, $C_8$–$C_{20}$ fatty acids, $C_9$–$C_{22}$ modified fatty acids, and combinations thereof. Fatty acids which are suitable for the practice of this invention have number average molecular weights in the range of about 100 to about 350. Sources of such suitable fatty acids include various animal fats and vegetable oils, glycerides, tall oil fatty acids, and petroleum derived fatty acids. The term "tall oil fatty acid" refers generally to the class of products containing 90% or more fatty acids which are obtained by fractionation of crude tall oil. The fatty acids are primarily a combination of oleic and linoleic acids, with small amounts of saturated and other unsaturated fatty acids. Common impurities include rosin and neutral materials.

Modified $C_9$–$C_{22}$ fatty acid suitable for the practice of this invention have number average molecular weights in the range of about 200 to about 470 and are produced by reacting in a Diels-Alder cycloaddition polyunsaturated fatty acids (such as linoleic acid) with fumaric acid, maleic anhydride, itaconic acid, metacrylic acid, acrylic acid, or citric acid (after dehydration and decarboxylation) to produce cyclic polycarboxylic acids. (The Diels-Alder reaction is described in the commonly assigned U.S. Pat. No. 5,194,640 to Cosgrove et al. which is hereby incorporated by reference).

Reaction products of unsaturated fatty acid such as oleic acid or nonconjugated linoleic acid with maleic anhydride via the "ene"-reaction are also suitable as $C_{22}$-fatty acid anhydrides. These types of tall oil fatty acid-derived anhydrides are described in U.S. Pat. No. 3,451,958 by Riedeman et al. (which is hereby incorporated by reference). Rosin suitable for the practice of this invention have molecular weights in the range of about 300 to about 350 and include wood rosin, gum rosin, and tall oil rosin. Modified $C_{23}$–$C_{24}$ rosins suitable for the practice of this invention have molecular weights in the range of about 370 to about 470 and are produced by reacting in a Diels-Alder cycloaddition rosin with fumaric acid, maleic anhydride, itaconic acid, metacrylic acid, acrylic acid, or citric acid (after dehydration and decarboxylation) to produce polycyclic polycarboxylic acid and acid anhydrides. (This Diels-Alder reaction is described in the commonly assigned, U.S. Pat. No. 5,208,319 to Schilling, which is incorporated herein by reference).

Polyamines which are suitable for the use in these methods have a number average molecular weight in the range of about 60 to about 1,000 and include many amines capable of forming an imidazoline when reacted with the polymer.

Such polyamines include, but are not limited to, the following: aminoethylethanolamine, aminoethylpiperazine, diethylenetriamine, triethylenetetramine, tetraethylenepentamine, hexaethyleneheptamine, bisaminopropylamine, pentamethylenediamine, hydroxyethylpiperazine, bis-hexamethylenetriamine, homologs, and combinations thereof.

Radical initiators which are suitable for the use in the above noted polymerization reactions include heat sensitive organic peroxides and azo compounds, and the like.

For application purposes it is preferred to produce adhesion promoters which are liquid in form. Therefore it may be necessary to adjust the viscosities of certain formulations by the addition of a solvent (a process well within the ability of a skilled artisan). Solvents which are suitable for use in the present methods include, but are not limited to, the following: ethylene glycol, diethylene glycol, polyethylene glycol, propylene glycol, alkanolamines, and combinations thereof. Preferred alkanolamines suitable for use as a solvent include monoethanolamine, diethanolamine, triethanolamine, combinations thereof, and the like.

The following examples are provided to further illustrate the present invention and are not to be construed as limiting the invention in any manner.

EXAMPLE 1

Three polyimidoamine adhesion promoters were produced via the following method. To three clean 2L three-necked flasks equipped with a stirrer, thermometer, and a reflux condenser with a Dean Stark trap were charged 100 parts by weight of a polyamine blend mainly consisting of triethylene tetramine and aminoethyl piperazine and 100 parts by weight diethylene glycol at room temperature. The flasks' contents were heated to 100–120° C., and with good agitation 0.5 parts by weight of either SMA-1000, SMA-2000, or SMA-3000 (styrene-maleic anhydride copolymers commercially available from Sartomer) was added slowly to the respective flasks. The mixtures were heated for 16 hours before being allowed to cool. The resulting polyimidoamine adhesion promoters are hereafter referred to as: AP#1, AP#2, and AP#3 (see Table I below).

EXAMPLE 2

Three preferred adhesion promoters were produced via the following method. Using the same type of reaction flasks noted in Example 1, 100 parts by weight of a polyamine blend mainly consisting of triethylene tetramine and aminoethyl piperazine and 100–120 parts by weight of a tall oil fatty acid blend containing less than 10% rosin was charged into three different flasks. The additions occurred at room temperature and resulted in exothermic reactions. The reaction mixtures were subsequently heated to 100°–120° C., and 30–50 parts by weight of either SMA-1000, SMA-2000, or SMA-3000 were added slowly to the respective flasks with agitation. The reaction mixtures were heated to 240°–260° C. and kept as this temperature for 16 hours before being allowed to cool. The resulting polyimidoamine adhesion promoters are hereafter referred to as AP#4, AP#5, and AP#6 (see Table I below).

EXAMPLE 3

This example illustrates the invention method utilizing the adhesion promoters produced in Examples 1 and 2 in anionic emulsions prepared with a sodium soap of tall oil (M28B) which were combined with granitic aggregate from Georgia. An emulsion was prepared from Amoco EB-20 asphalt at 65% asphalt residue using 0.8% tall oil soap (based on the weight of the emulsion) at pH 11.5 in a Gaulin colloid mill. The discharge temperature was 190° F. The emulsion was allowed to cool to 140° F., at which temperature the adhesion promoter (generally 0.3% based on the weight of the emulsion) was added to the emulsion. After one hour the emulsion was used for the coating experiments using granite retained on No. 8 U.S. Standard sieve. Sufficient emulsion was applied to achieve uniform coating of the aggregate. The mixes were allowed to dry for two days at ambient temperature.

To determine the efficiency of the methods utilizing the respective adhesion promoters the cured mixes were placed in a basket which was introduced into boiling water for ten minutes. After the basket was removed, the aggregate was spread on a clean paper towel and allowed to cool. The percent retained asphalt coat was judged visually after placing the sample in a shallow glass pan filled with cold water and by illuminating the surface of the coated stones with a 60 Watt lamp. The evaluation results are listed in Table I below.

TABLE I

Evaluation of Adhesion Promoters with
Anionic Asphalt Emulsions and Granite
Asphalt: Amoco EB-20, 65% Asphalt Residue
Emulsifier: Tall oil (M28B), 0.8%, pH 11.5
Aggregate: Granite (Georgia) passing No. 4 sieve, retained on No. 8 sieve

| Adhesion Promoter | Composition* | % Dosage | % Coating Before Boiling | % Coating After Boiling |
|---|---|---|---|---|
| AP#5 | L-5-SMA-3000-Amine Blend (100:50:100) | 0.3 | 100 | 95 |
| AP#6 | L-5-SMA-3000-Amine Blend (120:30:100) | 0.3 | 100 | 90 |
| AP#3 | SMA-3000-Amine Blend (50:100)/DEG(100) | 0.3 | 100 | 85 |
| AP#2 | SMA-2000-Amine Blend (50:100)/DEG(100) | 0.3 | 100 | 85 |
| AP#4 | L-5-SMA-2000-Amine Blend (120:30:100) | 0.3 | 100 | 80 |
| AP#1 | SMA-1000-Amine Blend (50:100)/DEG(100) | 0.3 | 100 | 80 |
| Control |  | 0 | 100 | 0 |
| AP#10 | L-5-Amine Blend (150:100) | 0.3 | 100 | 40 |
| AP#11 | L-5-Triethylene tetramine (162.5:100) | 0.3 | 100 | 30 |

*SMA-1000, 2000, 3000: Styrene-maleic anhydride copolymers (manufactured by Sartomer),
L-5: tall oil fatty acid
Amine Blend: consisting of triethylene tetramine and aminoethyl piperazine;
DEG: diethylene glycol The results noted in Table I clearly show the increased efficiency of the methods utilizing the novel adhesion promoters disclosed herein, especially when compared to conventional adhesion promoters such as tall oil- or modified tall oil-based condensates.

It is clear that the methods employing the novel adhesion promoter compositions taught herein achieved superior results when compared to conventional adhesion promoters used for asphalt aggregate compositions. Many modifications and variations of the present invention will be apparent to one skilled in the art in light of the above teaching. It is understood therefore that the scope of the invention is not to be limited by the foregoing description, but rather is to be defined by the claims appended hereto.

What is claimed is:

1. An improved method for enhancing adhesion between asphalt and aggregate in anionic bituminous emulsions wherein the improvement comprises the addition to the emulsion of a composition comprising the polyimidoamine condensation reaction products consisting essentially of:
   (A) 20–80 wt. % of a copolymer, formed by reacting
      (1) 1–99 wt. % of a member selected from the group consisting of α-methyl styrene, styrene, and combinations thereof, with
      (2) 99–1 wt. % of maleic anhydride; and
   (B) 80–20 wt. % of a polyamine.

2. The method of claim 1 wherein the composition comprises the polyimidoamine condensation reaction products consisting essentially of:
   (A) 30–70 wt. % of a copolymer, formed by reacting
      (1) 20–80 wt. % of a member selected from the group consisting of α-methyl styrene, styrene, and combinations thereof, with
      (2) 80–20 wt. % of maleic anhydride; and
   (B) 70–30 wt. % of a polyamine.

3. The method of claim 1 wherein the copolymer has a number average molecular weight in the range of about 1,000 to about 10,000.

4. The method of claim 1 wherein the polyamine has a number average molecular weight in the range of about 60 to about 1,000.

5. The method of claim 1 wherein the polyamine is a member selected from the group consisting of aminoethylethanolamine, aminoethylpiperazine, diethylenetriamine, triethylenetetramine, tetraethylenepentamine, hexaethyleneheptamine, bis-aminopropylamine, pentamethylenediamine, hydroxyethylpiperazine, bis-hexamethylenetriamine, and combinations thereof.

6. The method of claim 1 wherein the composition is dispersed in a solvent selected from the group consisting of ethylene glycol, diethylene glycol, polyethylene glycol, propylene glycol, alkanolamines, and combinations thereof.

7. An improved method for enhancing adhesion between asphalt and aggregate in anionic bituminous emulsions wherein the improvement comprises the addition to the emulsion of a composition comprising the polyimidoamine condensation reaction products consisting essentially of:
   (A) 20–80 wt. % of a mixture containing:
      (1) 20–80 wt. % of a copolymer formed by reacting
         (a) 1–99 wt. % of a member selected from the group consisting of α-methyl styrene, styrene, and combinations thereof, with
         (b) 99–1 wt. % of maleic anhydride; and
      (2) 80–20 wt. % of a member selected from the group consisting of rosin, C23–C24 polycyclic polycarboxylic acid reaction products of Diels-Alder modified rosins, C24 polycyclic polycarboxylic acid anhydride reaction products of Diels-Alder modified rosins C8–C20 fatty acids, C9–C22 cyclic polycarboxylic acid reaction products of Diels-Alder modified fatty acids, and combinations thereof; and
   (B) 80–20 wt. % of a polyamine.

8. The method of claim 7 wherein the composition comprises the polyimidoamine condensation reaction products consisting essentially of:
   (A) 30–70 wt. % of a mixture containing:
      (1) 20–80 wt. % of a copolymer formed by reacting
         (a) 20–80 wt. % of a member selected from the group consisting of α-methyl styrene, styrene, and combinations thereof, with
         (b) 80–20 wt. % of maleic anhydride; and
      (2) 80–20 wt. % of a member selected from the group consisting of rosin, C23–C24 polycyclic polycarboxylic acid reaction products of Diels-Alder modified rosins, C24 polycyclic polycarboxylic acid anhydride reaction products of Diels-Alder modified rosins, C8–C20 fatty acids, C9–C22 cyclic polycarboxylic acid reaction products of Diels-Alder modified fatty acids, and combinations thereof; and
   (B) 70–30 wt. % of a polyamine.

9. The method of claim 7 wherein the copolymer has a number average molecular weight in the range of about 1,000 to about 10,000.

10. The method of claim 7 wherein the polyamine has a number average molecular weight in the range of about 60 to about 1,000.

11. The method of claim 7 wherein the polyamine is a member selected from the group consisting of aminoethylethanolamine, aminoethylpiperazine, diethylenetriamine, triethylenetetramine, tetraethylenepentamine, hexaethyleneheptamine, bis-aminopropylamine, pentamethylenediamine, hydroxyethylpiperazine, bis-hexamethylenetriamine, homologs, and combinations thereof.

12. The method of claim 7 wherein the composition is dispersed in a solvent selected from the group consisting of ethylene glycol, diethylene glycol, polyethylene glycol, propylene glycol, alkanolamines, and combinations thereof.

* * * * *